United States Patent
Satoh et al.

(10) Patent No.: US 8,130,385 B2
(45) Date of Patent: Mar. 6, 2012

(54) INFORMATION PROCESSING APPARATUS AND INFORMATION PROCESSING METHOD

(75) Inventors: Kiyohide Satoh, Kawasaki (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 986 days.

(21) Appl. No.: 12/109,073

(22) Filed: Apr. 24, 2008

(65) Prior Publication Data
US 2008/0267531 A1    Oct. 30, 2008

(30) Foreign Application Priority Data
Apr. 25, 2007  (JP) ................ 2007-115987

(51) Int. Cl.
G01C 9/00  (2006.01)
G01B 11/14  (2006.01)
G66K 9/36  (2006.01)

(52) U.S. Cl. ........ 356/620; 356/614; 356/622; 382/291; 382/106; 702/153

(58) Field of Classification Search .......... 382/106, 382/141, 291, 271, 287, 154, 286; 702/153, 702/94, 150; 356/614, 620, 622
See application file for complete search history.

(56) References Cited

U.S. PATENT DOCUMENTS
7,970,576 B2 *  6/2011  Satoh .................. 702/153
2008/0228422 A1 *  9/2008  Satoh .................. 702/92
2008/0228434 A1 *  9/2008  Aratani et al. .......... 702/150
2008/0255789 A1 *  10/2008  Satoh ................... 702/95

OTHER PUBLICATIONS

Martin A. Fischler and Robert C. Bolles (Jun. 1981): Random Sample Consensus: A Paradigm for Model Fitting with Applications to Image Analysis and Automated Cartography, Comm. of the ACM, vol. 24, No. 6, pp. 381-395, 1981.

Daisuke Kotake, Shinji Uchiyama, and Hiroyuki Yamamoto: A Marker Calibration Method Utilizing a Priori Knowledge on Marker Arrangement, Proceedings of the Third IEEE and ACM International Symposium on Mixed and Augmented Reality (ISMAR 2004), 2004.

Leonid Naimark and Eric Foxlin: Circular Data Matrix Fiducial System and Robust Image Processing for a Wearable Vision-Inertial Self-Tracker, Proc. 1st International Symposium on Mixed and Augmented Reality (ISMAR 2002), pp. 27-36, 2002.

* cited by examiner

Primary Examiner — Layla Lauchman
(74) Attorney, Agent, or Firm — Cowan, Liebowitz & Latman, P.C.

(57) ABSTRACT

An index detection unit (110) detects the image coordinates of indices from a captured image. An index allocation information updating unit (160) calculates the position and orientation of an image capturing apparatus using the image coordinates of the indices and allocation information of each of these indices. Furthermore, the index allocation information updating unit (160) re-calibrates allocation information of an unreliable index having a reliability indicating that the allocation information is unreliable. The index allocation information updating unit (160) updates allocation information held by an allocation information holding unit (140) in association with the unreliable index to the re-calibrated allocation information and a reliability indicating that the allocation information is reliable.

15 Claims, 7 Drawing Sheets

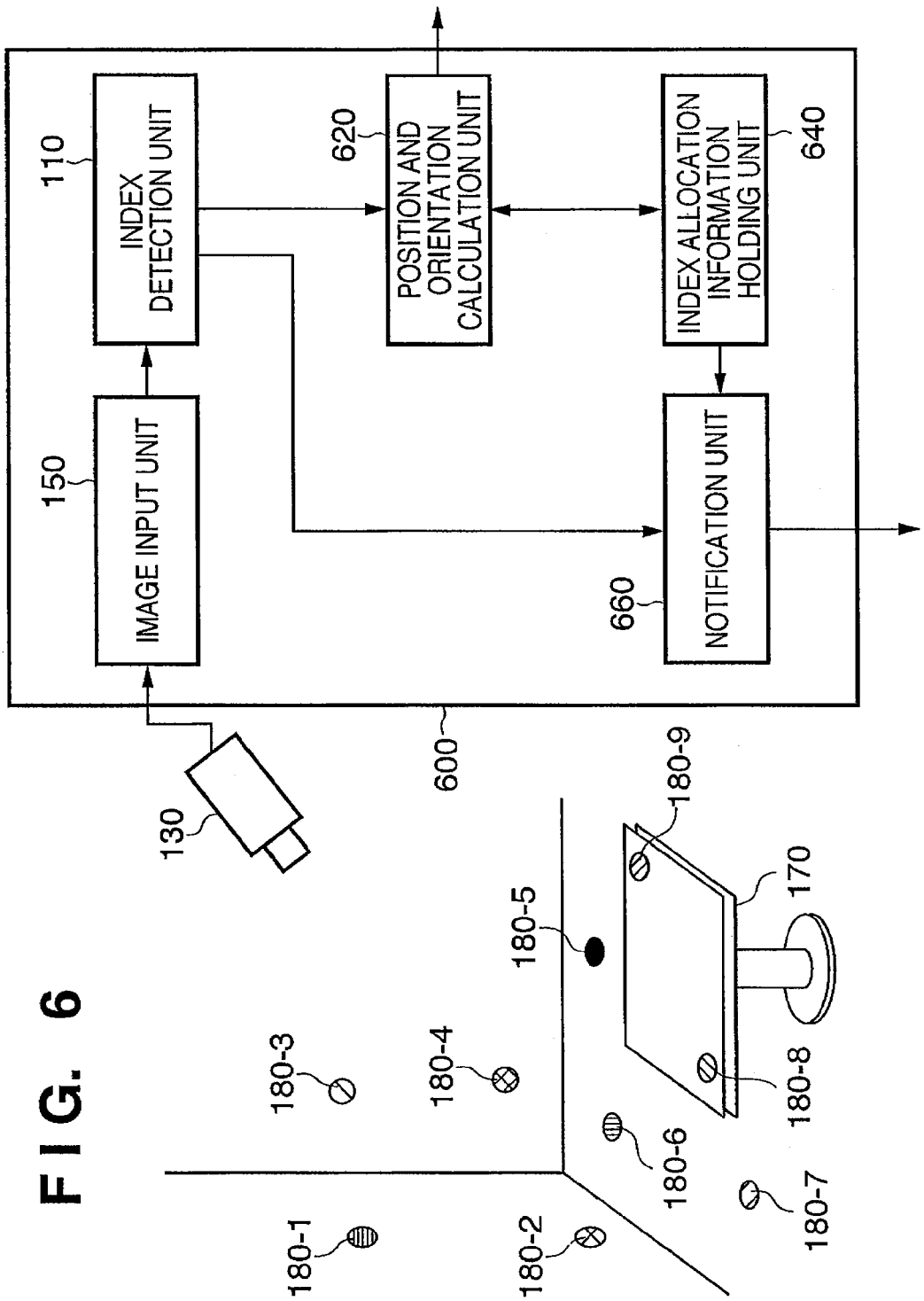

INFORMATION PROCESSING APPARATUS AND INFORMATION PROCESSING METHOD

BACKGROUND OF THE INVENTION

1. Field of the Invention

The present invention generally relates to an information processing apparatus and an information processing method thereof, particularly to a technique for measuring the position and orientation of an image capturing apparatus.

2. Description of the Related Art

Studies about mixed reality superimposing text and CG pictures on a physical space and presenting a result of superimposing have been extensively made. An image display apparatus that presents mixed reality can be implemented as an apparatus which superposes and renders, onto an image captured by an image capturing apparatus, an image generated according to the position and orientation of this image capturing apparatus, and displays.

In order to implement such technique, the relative position and orientation between a reference coordinate system defined on the physical space and a camera coordinate system need to be measured in real time. For example, a case will be examined below wherein a virtual object is superimposed at a predetermined position in a physical environment such as that in a room or on a table. In this case, a reference coordinate system is defined on an appropriate place (e.g., the floor surface of a room or the table surface) in that environment, and the position and orientation of a camera on the reference coordinate system can be measured.

In order to realize such measurement, it is a common practice to sequentially measure the position and orientation of a camera using time series images successively captured by the camera (see non-patent references 1, 2, and 3). For example, the position and orientation of the camera on the reference coordinate system can be calculated by the following sequence.

(1) A plurality of indices whose positions (reference coordinates) on the reference coordinate system are given are allocated or set on the floor, wall, table surface, or the like in a room.

(2) The image coordinates of the indices in a captured image captured by the camera are detected.

(3) The position and orientation of the camera are calculated based on the correspondence between the detected image coordinates of the indices and their reference coordinates.

Note that indices may be artificial markers which are intentionally set for the purpose of measurements, or may be features (natural features) or the like which originally exist on that environment.

In order to calculate the position and orientation of the camera by the above sequence, the allocation information of each index need to be acquired in advance as a preparation process. Note that the allocation information of each index represents the position of that index on the reference coordinate system. A process for calculating the allocation information of an index will be referred to as calibration of that index as needed hereinafter.

Normally, the calibration of the index is manually made using a surveying instrument, protractor, or the like. Also, a method of estimating the allocation information of an index based on a plurality of images captured in advance by the camera is used (see non-patent reference 4). In addition, a method of calibrating an index while sequentially executing the measurement of the position and orientation of the camera has been proposed (see non-patent reference 5).

An apparatus disclosed in non-patent reference 5 has an auto mapping mode for measuring the position and orientation of the camera while calibrating an unknown index, and a tracking mode for measuring only the position and orientation of the camera while the allocation information of each index is given. The user selectively uses these modes as needed.

[Non-patent Reference 1] Sato, Uchiyama, and Yamamoto: "UG+B: A Registration Framework Using User's View, Gyroscope, and Bird's-Eye View", Transactions of the Virtual Reality Society of Japan, vol. 10, no. 3, pp. 391-400, 2005.

[Non-patent Reference 2] Sato, Uchiyama, and Tamura: "Registration method in augmented reality", Transactions of the Virtual Reality Society of Japan, vol. 8, no. 2, pp. 171-180, 2003.

[Non-patent Reference 3] M. A. Fischler and R. C. Bolles (June 1981): Random Sample Consensus: A paradigm for model fitting with applications to image analysis and automated cartography, Comm. of the ACM, vol. 24, no. 6, pp. 381-395, 1981.

[Non-patent Reference 4] Kotake, Uchiyama, and Yamamoto: "A Marker Calibration Method Utilizing A Priori Knowledge on Marker Arrangement", Transactions of the Virtual Reality Society of Japan, vol. 10, no. 3, pp. 401-410, 2005.

[Non-patent Reference 5] Leonid Naimark and Eric Foxlin Circular data matrix fiducial system and robust image processing for a wearable vision-inertial self-tracker, Proc. 1st International Symposium on Mixed and Augmented Reality (ISMAR 2002), pp. 27-36, 2002.

[Non-patent Reference 6] R. Hartley and A. Zisserman, Multiple view geometry in computer vision: Second Edition, Cambridge University Press.

Upon measuring the allocation information of an index in advance, it is required that the index has never moved at the current timing since its calibration timing. For example, if only markers adhered on a stationary structural object such as a wall, floor, ceiling, or the like are used, this condition is basically satisfied.

However, when indices whose allocations are likely to change are included, if the allocation information measured in advance is used intact, the position and orientation of the camera cannot be accurately measured when the allocation of such index has changed. For example, when markers are allocated on a movable object such as doors of a wall cabinet, a desk with wheels, or the like, the user need to visually confirm if a situation at the calibration timing of the index has not changed at the current timing.

On the other hand, when the method of sequentially updating the allocation information of each index simultaneously with the position and orientation measurement of the camera (disclosed in non-patent reference 5) is used, a change in allocation information of each index can be coped with in principle. However, since all pieces of allocation information of all indices which are not handled as fixed indices within a visual field are always kept updated, the computation load is heavy. Therefore, the apparatus disclosed in non-patent reference 5 uses the auto mapping mode only when the user decides necessity of that mode. As a result, the user need to make a decision about the necessity or non-necessity of re-calibration of indices.

That is, the related arts have no means of knowing whether or not re-calibration of indices should be executed. For this reason, the user need to decide whether or not to execute re-calibration based on the self empirical knowledge.

Although only some indices are moved in most of actual scenes, no means for calibrating only indices that require re-calibration is prepared.

SUMMARY OF THE INVENTION

The present invention has been made in consideration of the aforementioned problems of the related arts. That is, it is an object of the present invention to provide a position and orientation measurement technique of an image capturing apparatus, which can obviate the need for deciding the propriety of the allocation information of each index and the necessity or non-necessity of re-calibration by the user based on the self empirical knowledge, and which allows easy management and maintenance.

It is another object of the present invention to provide a technique for calibrating only indices that require re-calibration.

According to the first aspect of the present invention, an information processing apparatus, comprises:

a holding unit adapted to hold, for each of a plurality of indices allocated on a physical space, allocation information and a reliability thereof;

an acquisition unit adapted to acquire a captured image from an image capturing apparatus which captures the physical space;

a detection unit adapted to detect image coordinates of an index from the captured image;

a calculation unit adapted to calculate a position and orientation of the image capturing apparatus using the image coordinates of the index detected by the detection unit and the allocation information held by the holding unit in association with the index;

a re-calibration unit adapted to re-calibrate allocation information of an unreliable index having a reliability indicating that the allocation information is unreliable; and an updating unit adapted to update the allocation information and the reliability thereof held by the holding unit in association with the unreliable index to the allocation information re-calibrated by the re-calibration unit and a reliability indicating that the allocation information is reliable.

According to the second aspect of the present invention, an information processing apparatus, comprises:

a holding unit adapted to hold, for each of a plurality of indices allocated on a physical space, allocation information and a reliability thereof;

an acquisition unit adapted to acquire a captured image from an image capturing apparatus which captures the physical space;

a detection unit adapted to detect image coordinates of an index from the captured image;

a calculation unit adapted to calculate a position and orientation of the image capturing apparatus using the image coordinates of the index detected by the detection unit and the allocation information held by the holding unit in association with the index; and a notification unit adapted to notify information associated with an unreliable index having a reliability indicating that the allocation information is unreliable.

According to the third aspect of the present intention, an information processing apparatus comprises:

a holding unit adapted to hold, for each of a plurality of indices allocated on a physical space, allocation information and a reliability thereof;

an acquisition unit adapted to acquire a captured image from an image capturing apparatus which captures the physical space;

a detection unit adapted to detect image coordinates of an index from the captured image; and a calculation unit adapted to calculate a position and orientation of the image capturing apparatus using image coordinates of an index having a reliability indicating that the allocation information is reliable from among the image coordinates of indices detected by the detection unit, and the allocation information held by the holding unit in association with that index.

According to the fourth aspect of the present invention, an information processing method to be executed by an information processing apparatus which comprises a holding unit which holds, for each of a plurality of indices allocated on a physical space, allocation information and a reliability thereof, the method comprises:

an acquisition step of acquiring a captured image from an image capturing apparatus which captures the physical space;

a detection step of detecting image coordinates of an index from the captured image;

a calculation step of calculating a position and orientation of the image capturing apparatus using the image coordinates of the index detected in the detection step and the allocation information held by the holding unit in association with the index;

a re-calibration step of re-calibrating allocation information of an unreliable index having a reliability indicating that the allocation information is unreliable; and an updating step of updating the allocation information and the reliability thereof held by the holding unit in association with the unreliable index to the allocation information re-calibrated in the re-calibration step and a reliability indicating that the allocation information is reliable.

According to the fifth aspect of the present invention, an information processing method to be executed by an information processing apparatus which comprises a holding unit which holds, for each of a plurality of indices allocated on a physical space, allocation information and a reliability thereof, the method comprises:

an acquisition step of acquiring a captured image from an image capturing apparatus which captures the physical space;

a detection step of detecting image coordinates of an index from the captured image;

a calculation step of calculating a position and orientation of the image capturing apparatus using the image coordinates of the index detected in the detection step and the allocation information held by the holding unit in association with the index; and a notification step of notifying information associated with an unreliable index having a reliability indicating that the allocation information is unreliable.

According to the sixth aspect of the present invention, an information processing method to be executed by an information processing apparatus which comprises a holding unit which holds, for each of a plurality of indices allocated on a physical space, allocation information and a reliability thereof, the method comprises:

an acquisition step of acquiring a captured image from an image capturing apparatus which captures the physical space;

a detection step of detecting image coordinates of an index from the captured image; and a calculation step of calculating a position and orientation of the image capturing apparatus using image coordinates of an index having a reliability indicating that the allocation information is reliable from among the image coordinates of indices detected in the detection step, and the allocation information held by the holding unit in association with that index.

Further features of the present invention will become apparent from the following description of exemplary embodiments with reference to the attached drawings.

BRIEF DESCRIPTION OF THE DRAWINGS

FIG. 6 is a block diagram showing the functional arrangement of a position and orientation measurement apparatus according to the second embodiment of the present invention.

DESCRIPTION OF THE EMBODIMENTS

Preferred embodiments of the present invention will be described in detail hereinafter with reference to the accompanying drawings. Note that these embodiments will be described as examples of preferred arrangements of the invention described in the scope of claims, and such invention is not limited to the embodiments to be described hereinafter.

First Embodiment

An information processing apparatus according to this embodiment measures the position and orientation of an image capturing apparatus using images captured by the image capturing apparatus. When the allocation information of each index has changed, the information processing apparatus according to this embodiment checks the necessity of re-calibration, and executes processing associated with re-calibration if it is necessary. The information processing apparatus according to this embodiment will be described hereinafter.

Figure 1:
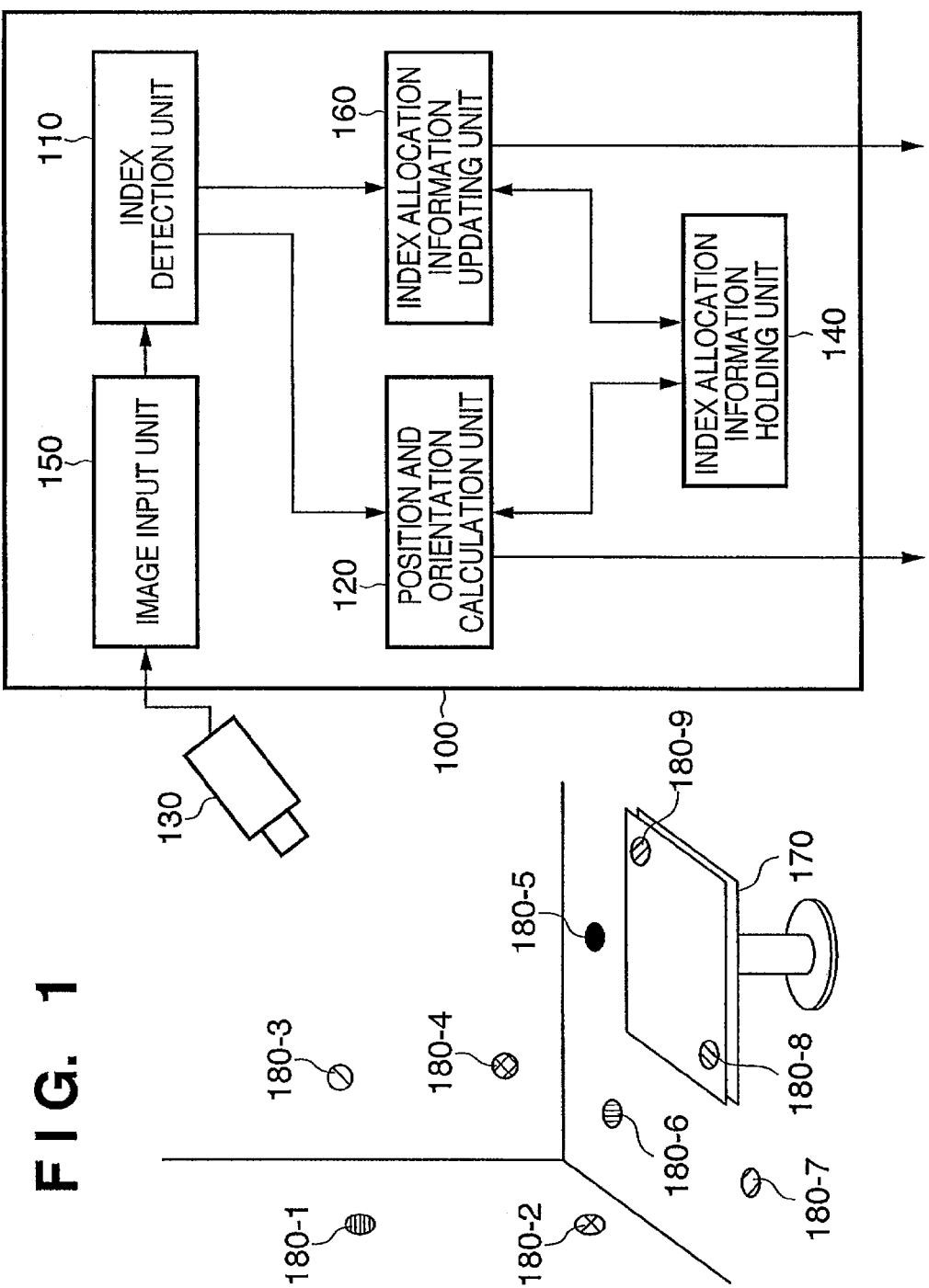
FIG. 1 is a block diagram showing the functional arrangement of a position and orientation measurement apparatus to which an information processing apparatus according to the first embodiment of the present invention is applied.

FIG. 1 is a block diagram showing the functional arrangement of a position and orientation measurement apparatus to which the information processing apparatus according to this embodiment is applied. As shown in FIG. 1, a position and orientation measurement apparatus 100 according to this embodiment comprises an image input unit 150, index detection unit 110, position and orientation calculation unit 120, index allocation information holding unit 140, and index allocation information updating unit 160. An image capturing apparatus 130 as an object, the position and orientation of which are to be measured, is connected to the image input unit 150. The position and orientation of the image capturing apparatus 130 are measured by the position and orientation measurement apparatus 100 according to this embodiment.

On a physical space, a reference coordinate system (expressed by symbol W) is defined. Indices 180 (180-1 to 180-9) are allocated at a plurality of positions on the physical space. When the image capturing apparatus 130 moves within the range in which the position and orientate of the image capturing apparatus 130 can be measured, the indices 180 are preferably arranged so that some of them are always be captured by the image capturing apparatus 130. In the following description, a k-th index 180 (180-$k$) is expressed by symbol $Q_k$. Note that k (k=1, 2, . . . , K) expresses an identifier (identification information) of the index 180. K expresses the total number of allocated indices 180, and K=9 in FIG. 1.

Figure 2:
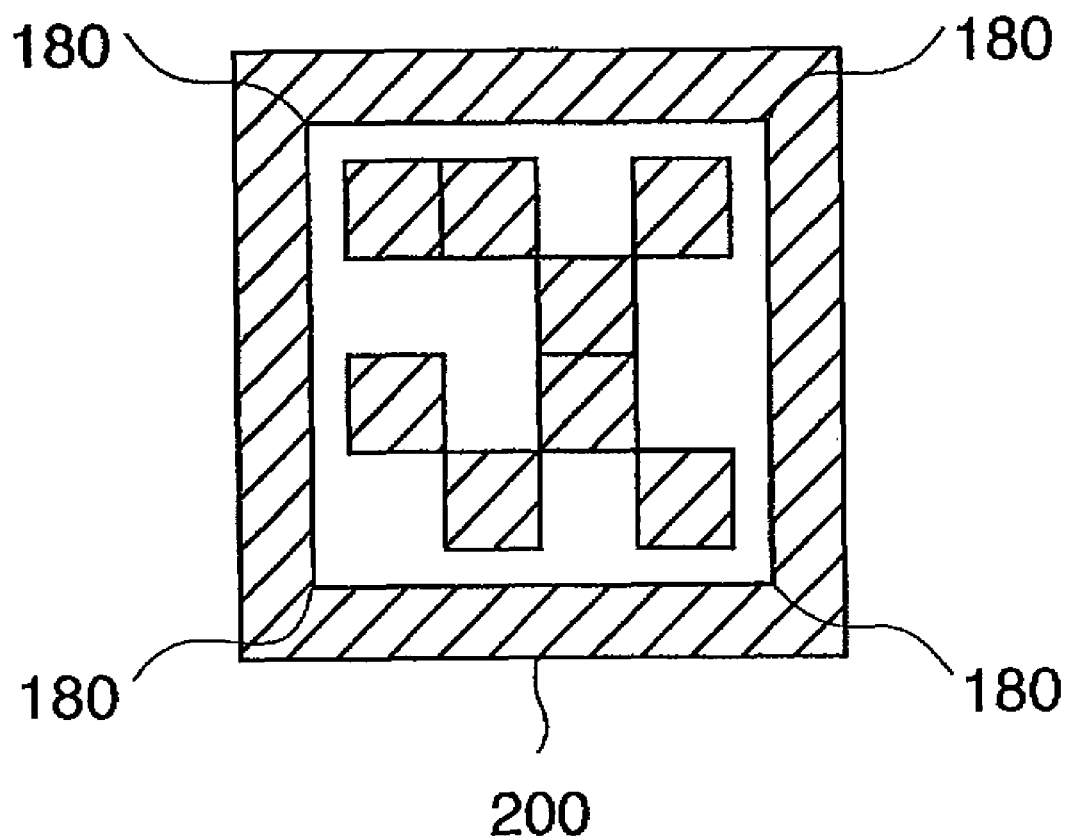
FIG. 2 shows an example of a white rectangular marker 200.

The respective indices 180 may be configured by color markers defined by small regions having different colors, or by feature points such as natural features or the like having different texture features. Arbitrary indices may be used as the indices 180 as long as the image coordinates are detectable from images captured by the image capturing apparatus 130, and these indices are identifiable from each other. The indices 180 may be intentionally (artificially) set. Features such as the corners of a desk, wall pattern, and the like which originally exist on the physical space may also be used as the indices 180. A polygonal marker defined by a single-color polygonal region having a certain area may be used as the indices 180. FIG. 2 shows an example of a white rectangular marker 200. In this case, the vertices of the polygon are used as the indices 180.

FIG. 1 shows a situation in which circular color markers 180-1 to 180-9 are allocated as the indices 180. Some indices 180-8 and 180-9 are allocated on a table 170, and other indices 180-1 to 180-7 are allocated on the wall surface and floor surface of a room.

The image capturing apparatus 130 and position and orientation measurement apparatus 100 will be described below.

The image capturing apparatus 130 comprises a video camera or the like, which captures a movie of the physical space, and images (to be referred to as captured images or physical space images hereinafter) of frames captured by the image capturing apparatus 130 are input to the image input unit 150 of the position and orientation measurement apparatus 100. A camera coordinate system is defined in advance on the image capturing apparatus 130, and the position and orientation measurement apparatus 100 measures the position and orientation of this camera coordinate system with respect to the reference coordinate system as those of the image capturing apparatus 130. Note that the camera coordinate system has the viewpoint position of the image capturing apparatus 130 as an origin, and defines a line of sight direction as a −Z-axis and two axes which are orthogonal to the Z-axis and are orthogonal to each other as X- and Y-axes. Also, camera intrinsic parameters such as the focal length and the like of the image capturing apparatus 130 are given.

Figure 3:
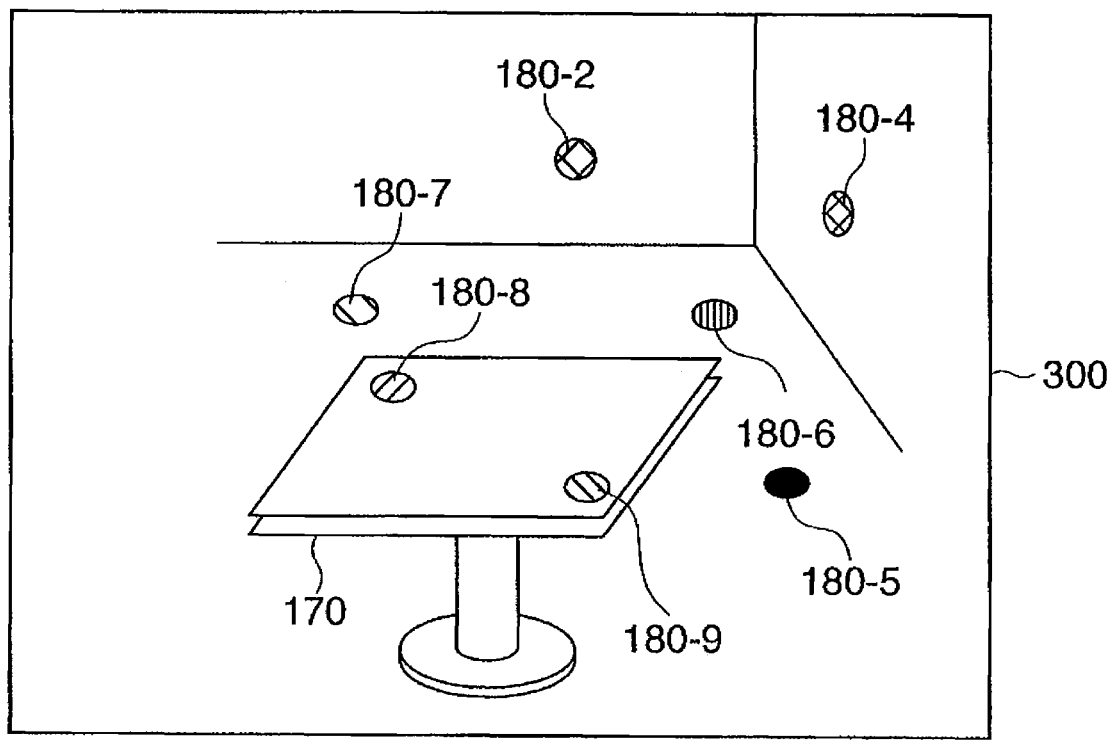
FIG. 3 shows an example of a captured image captured by an image capturing apparatus 130.

The image input unit 150 converts a captured image output from the image capturing apparatus 130 into digital data, and outputs converted data of the captured image to the subsequent index detection unit 110. FIG. 3 shows an example of a captured image captured by the image capturing apparatus 130. Referring to FIG. 3, reference numeral 300 denotes a captured image, which includes the table 170 and indices 180 (180-2, and 180-4 to 180-9).

The index detection unit 110 detects and identifies the indices 180 included in each captured image received from the image input unit 150. That is, the index detection unit 110 detects identification information (identifier, ID, or the like) of each index included in the captured image, and the image coordinates of that index.

The indices 180 are detected by methods according to the types of indices to be used. For example, when respective indices 180 are configured by color markers having different colors, regions corresponding to respective marker colors are detected from a captured image, and the barycentric positions of the detected regions are used as image coordinates of the indices 180. When the indices 180 are configured by feature points having different texture features, the image coordinates of the indices 180 are detected by template matching using template images. In this case, the template images of the respective indices are held in a memory in advance as given information.

When the rectangular marker 200 shown in FIG. 2 is used, the captured image undergoes binarization processing and labeling processing to detect label regions each defined by four straight lines as marker candidates. Then, it is checked if the rectangular regions of the respective marker candidates include specific patterns, thereby eliminating detection errors. Also, the identifier of each rectangular marker 200 is acquired based on the pattern in the rectangular region. Finally, the coordinates of the four vertices of the rectangular region are output as the positions of four points of the indices 180.

In the following description, an index 180 detected from the captured image will be referred to as a "detected index". Also, in the following description, the image coordinates of the detected index Qk are described as $u^{Qk}$. In this case, k represents the identification information of the detected index.

The index detection unit 110 outputs sets of identification information k and image coordinates $u^{Qk}$ for each detected index Qk to the subsequent position and orientation calculation unit 120 and index allocation information updating unit 160.

The index allocation information holding unit 140 holds sets of identification information, allocation information (position of the index 180 on the reference coordinate system), and a reliability for respective indices Qk. The reliability will be described in detail later, and indicates the reliability with respect to that allocation information. The index allocation information holding unit 140 checks according to this reliability if re-calibration of the corresponding allocation information is to be executed. If the index allocation information holding unit 140 determines that re-calibration is required, it sets the operation mode of the position and orientation measurement apparatus 100 to be an "allocation information updating mode". If the index allocation information holding unit 140 determines that re-calibration is not required, it sets the operation mode of the position and orientation measurement apparatus 100 to be a "position and orientation calculation mode".

Note that in the following description, the allocation information of the index Qk, i.e., the position of the index Qk on the reference coordinate system will be referred to as reference coordinates and described as $x_W^{Qk}$.

Note that the index allocation information holding unit 140 holds the allocation information $x_W^{Qk}$ of each index Qk, as described above. Not all the positions of the indices Qk are fixed on the physical space. Therefore, when the position of the index Qk on the physical space has changed, actual allocation information becomes different from the allocation information held by the index allocation information holding unit 140. For example, in FIG. 3, when the table 170 has moved after the measurement timing of the indices 180, the pieces of allocation information of the indices 180-8 and 180-9 held by the index allocation information holding unit 140 assume values different from pieces of actual allocation information. The position and orientation measurement apparatus 100 has an arrangement that can cope with such situation, as will be described below.

The position and orientation calculation unit 120 operates only when the operation mode of the position and orientation measurement apparatus 100 is set to be the "position and orientation calculation mode". When the "position and orientation calculation mode" is set, the position and orientation calculation unit 120 acquires, from the index detection unit 110, sets of identification information k and image coordinates $u^{Qk}$ for respective indices Qk detected from the captured image. On the other hand, the position and orientation calculation unit 120 acquires the identification information k and allocation information $x_W^{Qk}$ held in the index allocation information holding unit 140 to be in the set together with the identification information k in each acquired set. That is, the position and orientation calculation unit 120 acquires the sets of image coordinates $u^{Qk}$ and allocation information $x_W^{Qk}$ for respective indices Qk acquired from the captured image from the index detection unit 110 and index allocation information holding unit 140.

The position and orientation calculation unit 120 calculates the position and orientation of the image capturing apparatus 130 using the sets of image coordinates $u^{Qk}$ and allocation information $x_W^{Qk}$ for respective indices Qk (calculation processing). A technique for such calculations is a state-of-the-art technique. The position and orientation calculation unit 120 externally outputs data indicating the calculated position and orientation.

The position and orientation calculation unit 120 calculates the reliability for each index Qk during the calculation processing for calculating the position and orientation of the image capturing apparatus 130. The position and orientation calculation unit 120 outputs data of the calculated reliability of each index Qk to the index allocation information holding unit 140 to form a set together with the identification information k.

The index allocation information holding unit 140 executes processing for updating the reliability held as the set together with the identification information k received from the position and orientation calculation unit 120 to that output from the position and orientation calculation unit 120 as the set together with the identification information k.

In this way, when the "position and orientation calculation mode" is set, the reliability of each index Qk is registered in the index allocation information holding unit 140. That is, the latest reliability for each index Qk is always registered in the index allocation information holding unit 140.

In this embodiment, the position and orientation calculation unit 120 outputs the reliabilities calculated for indices Qk corresponding to all pieces of identification information k received from the index detection unit 110 to the index allocation information holding unit 140. Alternatively, the position and orientation calculation unit 120 may output only the reliability equal to or lower than a threshold to the index allocation information holding unit 140 together with the identification information k.

The index allocation information updating unit 160 operates only when the operation mode of the position and orientation measurement apparatus 100 is set to be the "allocation information updating mode". When the "allocation information updating mode" is set, the index allocation information holding unit 140 specifies sets including reliabilities "indicating that the allocation information is reliable" of those held by itself. Then, the index allocation information holding unit 140 outputs the identification information k and allocation information $x_W^{Qk}$ in each of the specified sets to the index allocation information updating unit 160.

The index allocation information updating unit 160 calculates the position and orientation of the image capturing apparatus 130 using the allocation information $x_W^{Qk}$ received from the index allocation information holding unit 140, and the image coordinates $u^{Qk}$ received from the index detection unit 110 in the set together with the identification information k that form the set with that allocation information. That is, the index allocation information updating unit 160 calculates the position and orientation of the image capturing apparatus 130 using the pieces of allocation information and image coordinates of the indices with high reliabilities (reliable indices) which do not require re-calibration.

After that, the index allocation information holding unit 140 specifies sets including reliabilities "indicating that the allocation information is unreliable" of those held by itself, and outputs the identification information k (=k') in each of the specified sets to the index allocation information updating unit 160.

The index allocation information updating unit 160 re-calibrates allocation information $x_W^{Qk'}$ using image coordinates $u^{Qk'}$ received from the index detection unit 110 in the set together with the identification information k' received from the index allocation information holding unit 140, and the previously calculated positions and orientations of the image capturing apparatus 130. That is, the index allocation information updating unit 160 re-calibrates the allocation information of an index with a low reliability (unreliable index) which requires re-calibration.

The index allocation information updating unit 160 outputs a set of the re-calibrated allocation information $x_W^{Qk'}$ and identification information k' of the unreliable index to the index allocation information holding unit 140. Upon reception of this set, the index allocation information holding unit 140 updates the allocation information $x_W^{Qk'}$ held in the set with the identification information k' in the received set to the re-calibrated allocation information $x_W^{Qk'}$ in the received set. Furthermore, the index allocation information holding unit 140 updates the reliability held in the set together with the identification information k' in the received set to a reliability "indicating that the allocation information is reliable".

For example, when the reliabilities of the indices 180-8 and 180-9 "indicate that the allocation information is unreliable" in the captured image shown in FIG. 3, the pieces of allocation information of these indices are re-calibrated, and the pieces of held allocation information are updated to those after re-calibration.

Details of the processes executed by the position and orientation calculation unit 120, index allocation information holding unit 140, and index allocation information updating unit 160 will be described below with reference to the flowchart of FIG. 5.

Figure 5:
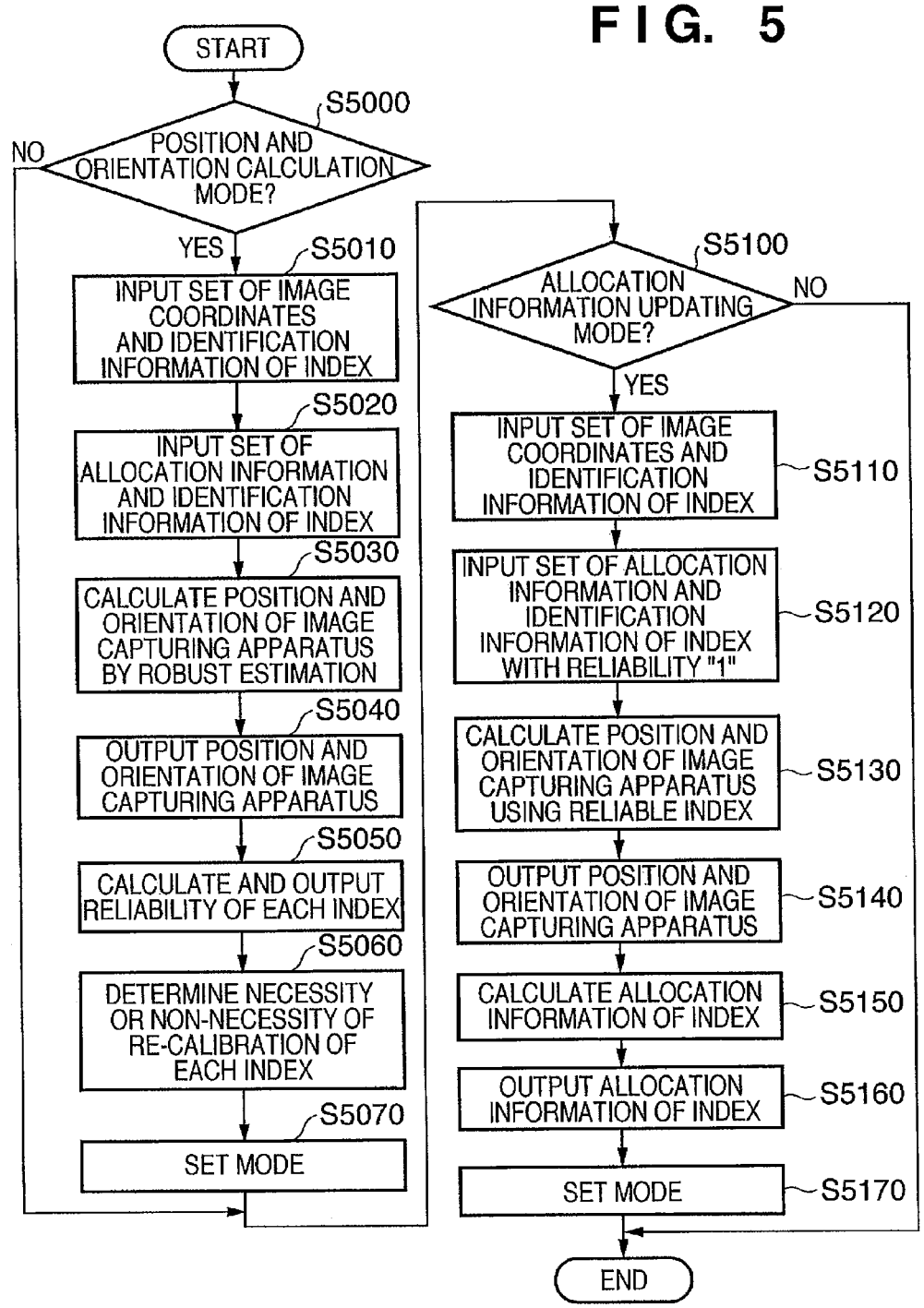
FIG. 5 is a flowchart showing details of the processes to be executed by a position and orientation calculation unit 120, index allocation information holding unit 140, and index allocation information updating unit 160.

FIG. 5 is a flowchart showing details of the processes executed by the position and orientation calculation unit 120, index allocation information holding unit 140, and index allocation information updating unit 160. Note that the flowchart of FIG. 5 shows the processes to be executed by the position and orientation calculation unit 120, index allocation information holding unit 140, and index allocation information updating unit 160 when a captured image for one frame is input from the image capturing apparatus 130 to the position and orientation measurement apparatus 100 via the image input unit 150. Therefore, the flowchart of FIG. 5 shows the processes executed every time a captured image of each frame is input from the image capturing apparatus 130 to the position and orientation measurement apparatus 100.

Before step S5000, the image capturing apparatus 130 inputs a captured image to the index detection unit 110 via the image input unit 150. The index detection unit 110 detects sets of identification information k and image coordinates $u^{Qk}$ for respective indices Qk included in that captured image. The index detection unit 110 outputs the detected sets for respective indices Qk to the position and orientation calculation unit 120 and index allocation information updating unit 160.

If the currently set operation mode of the position and orientation measurement apparatus 100 is the "position and orientation calculation mode", the process advances to step S5010 via step S5000. On the other hand, if the currently set operation mode of the position and orientation measurement apparatus 100 is not the "position and orientation calculation mode", the process jumps to step S5100 via step S5000.

In step S5010, the position and orientation calculation unit 120 acquires sets of identification information k and image coordinates $u^{Qk}$ for respective indices Qk output from the index detection unit 110.

In step S5020, the position and orientation calculation unit 120 acquires identification information k and allocation information $x_W^{Qk}$ held in the index allocation information holding unit 140 to be included in the set together with the identification information k in each set acquired in step S5010.

In step S5030, the position and orientation calculation unit 120 calculates the position and orientation of the image capturing apparatus 130 using the sets of image coordinates $u^{Qk}$ and allocation information $x_W^{Qk}$ for respective indices Qk. The calculations use a known robust estimation method that calculates the position and orientation of the image capturing apparatus 130 while executing outlier removal using the correspondence between pieces of allocation information (three-dimensional coordinates) of n indices and their image coordinates. For example, a RANSAC algorithm as a method of rejecting outliers by repeating position and orientation estimation using a plurality of randomly selected points and verification of the validity of a solution is used (see non-patent reference 2 for details).

In general, outlier rejection by a robust estimation method such as RANSAC or the like is used to eliminate the influence of detection errors of indices. More specifically, when a region different from an index is detected as an index, or when a certain index is erroneously identified as another index, these data are eliminated as outliers. On the other hand, assume that the index detection unit 110 according to this embodiment normally executes detection and identification of indices. In this case, when allocation information of an index is different, that data is eliminated as an outlier.

In step S5040, the position and orientation calculation unit 120 externally outputs data indicating the position and orientation of the image capturing apparatus 130 calculated in step S5030.

In step S5050, the position and orientation calculation unit 120 calculates the reliability for each index Qk during the processing in step S5030. More specifically, the position and orientation calculation unit 120 sets the reliability of an index Qk which is determined as an outlier in step S5030 to be "0", and that of an index which is not determined as an outlier to be "1". If the reliability is "0", it is a reliability "indicating that the allocation information is unreliable and necessity of re-calibration of allocation information"; if the reliability is "1", it is a reliability "indicating that the allocation information is reliable and non-necessity of re-calibration". Note that the reliability may be defined based on the magnitude of a residual error on a captured image.

The position and orientation calculation unit 120 outputs sets of data of the calculated reliabilities of respective indices Qk and identification information k to the index allocation information holding unit 140. The index allocation information holding unit 140 executes processing for updating the reliabilities held in the sets with the identification information k received from the position and orientation calculation unit 120 to those output from the position and orientation calculation unit 120 in the sets with the identification information k.

In step S5060, the index allocation information holding unit 140 refers to the reliabilities in the held sets, and checks whether or not to re-calibrate allocation information. For example, if the reliability of a certain index becomes equal to or lower than a threshold even once, the index allocation information holding unit 140 determines that re-calibration of the allocation information of that index is required. Alternatively, the index allocation information holding unit 140 may hold the histories of reliabilities in old frames, and may determine the necessity or non-necessity of re-calibration according to the histories of reliabilities. For example, when the reliability of a certain index is kept equal to or lower than a threshold during a predetermined period of time, the index allocation information holding unit 140 determines that re-calibration of that index is to be executed. Alternatively, the index allocation information holding unit 140 counts, for each index, the number of frames in which the reliability becomes equal to or lower than a threshold, and determines that re-calibration is required when the count value exceeds a threshold.

If the index allocation information holding unit 140 determines that at least one index that requires re-calibration of allocation information is detected, it sets the operation mode of the position and orientation measurement apparatus 100 to be the "allocation information updating mode" in step S5070. Note that this criterion may be detection of a predetermined number or more of indices that require re-calibration.

If the currently set operation mode of the position and orientation measurement apparatus 100 is the "allocation information updating mode", the process advances to step S5110 via step S5100. On the other hand, if the currently set operation mode of the position and orientation measurement apparatus 100 is not the "allocation information updating mode", this processing ends via step S5100, and the processes in step S5000 and subsequent steps are executed for a captured image of the next frame.

In step S5110, the index allocation information updating unit 160 acquires sets of identification information k and image coordinates $u^{Qk}$ for respective indices Qk output from the index detection unit 110.

In step S5120, the index allocation information holding unit 140 specifies sets including the reliability "1" of those held by itself. Since the index allocation information holding unit 140 outputs identification information k and allocation information $x_W^{Qk}$ of the specified sets to the index allocation information updating unit 160, the index allocation information updating unit 160 receives the sets output from the index allocation information holding unit 140.

In step S5130, the index allocation information updating unit 160 calculates the position and orientation of the image capturing apparatus 130 using the allocation information $x_W^{Qk}$ received in step S5120 and the image coordinates $u^{Qk}$ corresponding to the identification information k received in step S5120 of those received in step S5110. Since the method of calculating the position and orientation of the image capturing apparatus 130 using the correspondence between pieces of allocation information (three-dimensional coordinates) of n indices Qk and their image coordinates is known to those who are skilled in the art, a description thereof will not be given (for example, see non-patent reference 2).

In step S5140, the index allocation information updating unit 160 externally outputs data indicating the position and orientation of the image capturing apparatus 130 calculated in step S5130.

In step S5150, the index allocation information holding unit 140 specifies sets including the reliability "0" of those held by itself, and outputs identification information k (=k') in the specified sets to the index allocation information updating unit 160.

The index allocation information updating unit 160 re-calibrates allocation information $x_W^{Qk'}$ using image coordinates $u^{Qk'}$ received from the index detection unit 110 in the set with the identification information k' received from the index allocation information holding unit 140 and the previously calculated positions and orientations of the image capturing apparatus 130. In this re-calibration processing, for example, data of two frames in which the positions of the image capturing apparatus 130 are sufficiently different are selected, and allocation information of an index Qk is calculated by the principle of triangulation. The number of images to be used may be three or more, and in this case, a solution can be calculated by the method of least squares.

In step S5160, the index allocation information updating unit 160 outputs a set of allocation information $x_W^{Qk'}$ of an unreliable index re-calibrated in step S5150, and identification information k' of an unreliable index to the index allocation information holding unit 140. Upon reception of the set, the index allocation information holding unit 140 updates allocation information $x_W^{Qk'}$ held in the set with the identification information k' in the received set to the re-calibrated allocation information $x_W^{Qk'}$ in the received set. Furthermore, the index allocation information holding unit 140 updates the reliability held in the set with the identification information k' in the received sets to a reliability "indicating non-necessity of re-calibration".

In step S5170, the index allocation information holding unit 140 waits until re-calibration of allocation information corresponding to all pieces of identification information k' output to the index allocation information updating unit 160 in step S5150 is completed. If re-calibration is complete, the index allocation information holding unit 140 sets the operation mode of the position and orientation measurement apparatus 100 to be the "position and orientation calculation mode".

After that, this processing ends, and the processes in step S5000 and subsequent steps are executed for a captured image of the next frame.

As described above, according to this embodiment, allocation information of only an index which has a low reliability of the allocation information can be re-calibrated without the intervention of the user. With this processing, a situation in which the position of an index has changed can be coped with. Compared to the conventional method which continuously calculates the allocation information of each index, the processing load on a computer can be reduced.

Second Embodiment

A position and orientation measurement apparatus according to this embodiment measures the position and orientation of an image capturing apparatus using images captured by the image capturing apparatus in the same manner as in the first embodiment, except for the following differences. That is, when allocation information of each index has changed, the position and orientation measurement apparatus according to this embodiment checks the necessity of re-calibration, and notifies the user of information associated with re-calibration if it is necessary. The position and orientation measurement apparatus according to this embodiment will be described hereinafter.

FIG. 6 is a block diagram showing the functional arrangement of the position and orientation measurement apparatus according to this embodiment. Note that the same reference numerals in FIG. 6 denote the same parts as those shown in FIG. 1, and a repetitive description thereof will be avoided.

As shown in FIG. 6, a position and orientation measurement apparatus 600 comprises an image input unit 150, index detection unit 110, position and orientation calculation unit 620, index allocation information holding unit 640, and notification unit 660.

The differences of the position and orientation measurement apparatus 600 according to this embodiment from the position and orientation measurement apparatus 100 shown in FIG. 1, i.e., the position and orientation calculation unit 620, index allocation information holding unit 640, and notification unit 660, will be described below.

The index allocation information holding unit 640 holds the same kinds of information as in the index allocation information holding unit 140 shown in FIG. 1, and exchanges data with the position and orientation calculation unit 620 in the same manner as that between the index allocation information holding unit 140 and position and orientation calculation unit 120. Note that the index allocation information holding unit 640 does not set the operation mode of the position and orientation measurement apparatus 600.

The position and orientation calculation unit 620 executes the same processing as the position and orientation calculation unit 120 shown in FIG. 1. Since no operation mode is set for the position and orientation measurement apparatus 600, as described above, the position and orientation calculation unit 620 always operates unlike the position and orientation calculation unit 120 of the first embodiment. That is, the position and orientation calculation unit 620 executes the processes in steps S5010 to S5050 in the flowchart of FIG. 5.

The notification unit 660 externally outputs information about an index with a low reliability, thereby notifying the user of that information. For example, when pieces of allocation information of indices 180-8 and 180-9 require re-calibration in the captured image 300 shown in FIG. 3, the notification unit 660 outputs data of display dialogs shown in FIGS. 7A to 7C to an external display device (not shown).

Figure 7A:
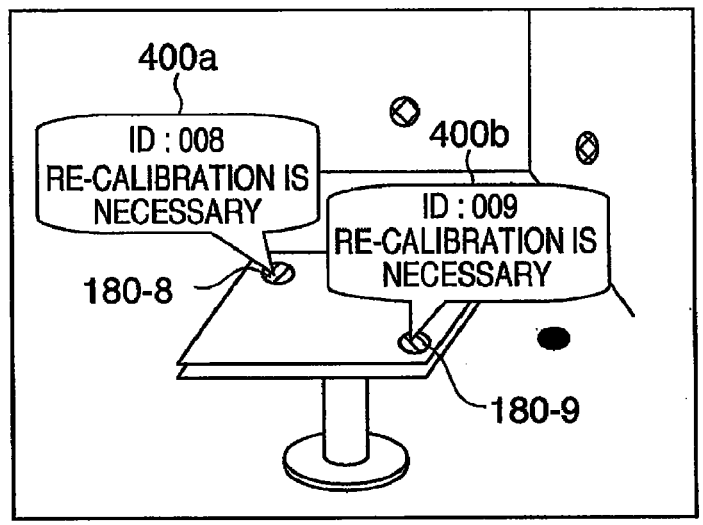
FIGS. 7A to 7C show examples of notification information generated by a notification unit 660.
Figure 7B:
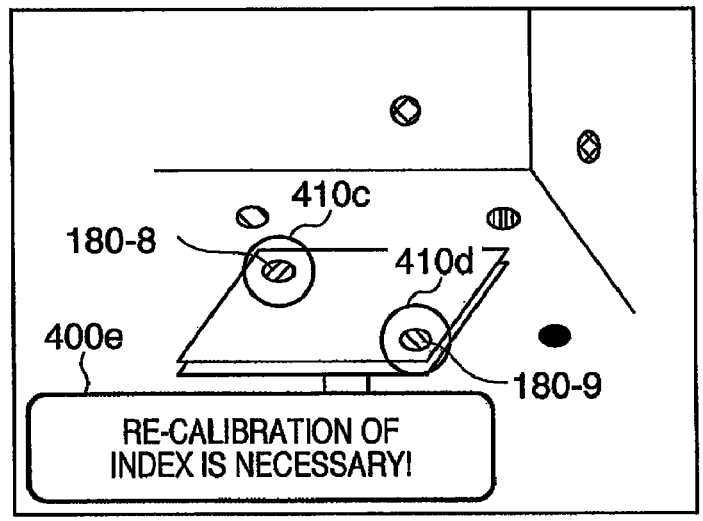
Figure 7C:
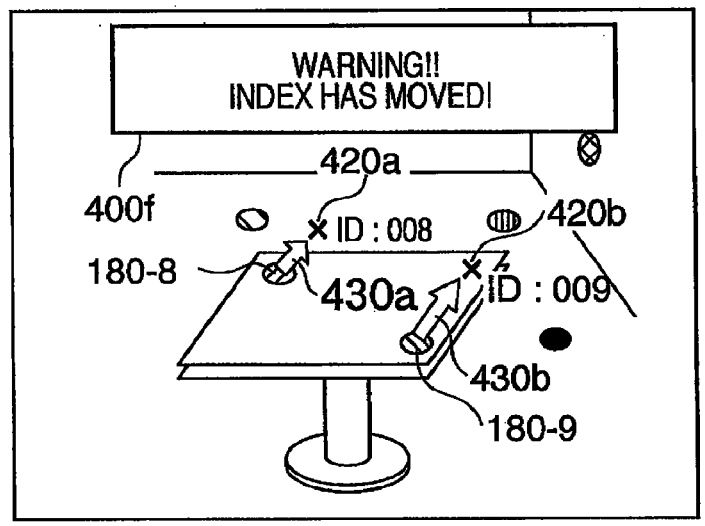

FIGS. 7A to 7C show examples of notification information generated by the notification unit 660. In FIG. 7A, sets 400*a* and 400*b* of a message indicating that re-calibration is required and identification information are displayed near the image coordinates of the indices 180-8 and 180-9. In order to implement such display, the position and orientation measurement apparatus 600 executes the following processing.

The index allocation information holding unit 640 specifies sets including a reliability "0" of those held by itself, and outputs identification information k (=k') in the specified sets to the notification unit 660.

The notification unit 660 receives, from the index detection unit 110, sets of identification information k and image coordinates $u^{Qk}$ for respective indices Qk detected from a captured image. The notification unit 660 specifies the image coordinates $u^{Qk'}$ included in the sets with the identification information k' received from the index allocation information holding unit 640 of those received from the index detection unit 110. The notification unit 660 displays the message and identification information k' at a coordinate position near the image coordinates $u^{Qk'}$.

The notification unit 660 may adopt the following notification method. That is, as shown in FIG. 7B, the notification unit 660 displays a message 400*e* indicating that re-calibration is required at an appropriate position on a captured image, and displays markers 410*c* and 410*d* with an appropriate shape near the image coordinates of the indices 180-8 and 180-9 so as to specify (emphasize) these indices 180-8 and 180-9. In order to implement such display, the position and orientation measurement apparatus 600 executes the following processing.

The index allocation information holding unit 640 specifies sets including a reliability "0" of those held by itself, and outputs identification information k (=k') in the specified sets to the notification unit 660.

The notification unit 660 receives, from the index detection unit 110, sets of identification information k and image coordinates $u^{Qk}$ for respective indices Qk detected from a captured image. The notification unit 660 specifies the image coordinates $u^{Qk'}$ included in the sets with the identification information k' received from the index allocation information holding unit 640 of those received from the index detection unit 110. Then, the notification unit 660 displays a maker at the image coordinates $u^{Qk'}$. Also, the notification unit 660 displays the message 400*e* at an appropriate position on a captured image (so as not to hide the displayed marker).

Note that the display position of a message need not to be that on a captured image. Also, identification information, a message, and a marker may be arbitrarily combined and displayed. The notification mode is not limited to display, and notification may be made by means of sounds or vibrations. Furthermore, display and other notification modes may be combined, or only one notification mode may be adopted.

Alternatively, allocation information currently held in association with an index (unreliable index), the allocation information of which requires re-calibration, may be projected onto a captured image, thereby presenting the image coordinates and projected image of that unreliable index to the observer on the captured image.

Such projection can be calculated based on the position and orientation of the image capturing apparatus 130 calculated by the position and orientation calculation unit 620 and the allocation information $x_W^{Qk}$ of an unreliable index held by the index allocation information holding unit 640 using an observation equation F described by:

$$u^{Qk*} = F(M, x_W^{Qk}) \qquad (1)$$

where M represents a 4×4 coordinate transformation matrix which represents the position and orientation of the image capturing apparatus 130. The observation equation F includes a viewing transformation that transforms reference coordinates into camera coordinates based on M, and a perspective transformation that transforms camera coordinates into image coordinates. The coordinates of the unreliable index on the captured image, which are calculated using equation (1), will be referred to as projected coordinates hereinafter.

For example, as shown in FIG. 7C, a message 400*f* indicating that indices have deviated is displayed, and X marks 420*a* and 420*b* are displayed at projected positions (projected coordinates) of pieces of allocation information of the unreliable indices 180-8 and 180-9 on the captured image. Alternatively, X marks may be displayed at projected positions of pieces of allocation information of all indices on the captured image. The colors and sizes of these X marks may be changed according to the reliability values.

Also, as shown in FIG. 7C, arrows 430*a* and 430*b* which couple the image coordinates $u^{Qk}$ of the unreliable indices and the projected coordinates $u^{Qk*}$ calculated by equation (1) may be displayed. The directions of the arrows 430*a* and 430*b* may be directed from the image coordinates to the projected coordinates or vice versa.

As described above, according to this embodiment, the position and orientation measurement apparatus can notify the user of various kinds of information associated with an index with a low reliability of allocation information in the process for measuring the position and orientation of the image capturing apparatus 130. With such information, the user can determine whether re-calibration of the allocation information is executed or the physical allocation of the index is returned to an appropriate position, thereby maintaining accurate measurement of the position and orientation.

<Modification 1>

The robust estimation processing in the above embodiment may use methods other than the RANSAC algorithm. For example, position and orientation estimation that eliminates the influences of outliers by M-estimation as a state-of-the-art technique may be executed (for example, see appendix A6.8 of non-patent reference 6). When the M-estimation is used, since the weight of each detected index which contributes to a solution can be calculated during the calculation process, this weight may be used as the reliability of each index.

<Modification 2>

In the first embodiment, the calculations associated with re-calibration of allocation information executed by the index allocation information updating unit 160 can be implemented by other methods. For example, a method of sequentially updating allocation information using an extended Kalman filter, as disclosed in non-patent reference 5 may be used. In this case, state vectors may be defined by the position and orientation of the image capturing apparatus 130 and the position of each index 180 to be re-calibrated, and these state vectors may be updated using the detected coordinates of each index as an input. Since the likelihood of each state vector is calculated during filtering processing, the end of processing can be checked based on this value.

<Modification 3>

Like the vertices of the rectangular marker 200, the relative positional relationship among the plurality of indices 180 is often fixed as the nature of indices. Even when such indices are used, the above embodiment checks the necessity or non-necessity of re-calibration for each index 180. However, for example, when the vertices of the rectangular marker 200 are used, the necessity or non-necessity of re-calibration should be checked for each rectangular marker 200. In this case, since the reliability is obtained for each vertex, a representative value of the reliabilities of the four vertices is calculated, and is used as the reliability of allocation information of the rectangular marker 200. The representative value of the reliabilities is defined by, e.g., the minimum value of the reliabilities of the four vertices. Then, the necessity or non-necessity of re-calibration is checked for each rectangular marker 200 based on the obtained reliability.

When it is determined that re-calibration of the rectangular marker 200 is necessary, the index allocation information updating unit 160 updates all the positions of the indices 180 as the four vertices of the rectangular marker 200. Note that the notification unit 660 may make a display indicating necessity of re-calibration for each rectangular marker 200 in place of each index 180.

Note that the allocation information of the rectangular marker 200 is often described and managed based on the position and orientation of an index coordinate system defined on the index on the reference coordinate system (see non-patent reference 4). In this case, after the three-dimensional positions of respective vertices are individually estimated, the allocation information may be transformed into an expression based on the position and orientation in accordance with information of the sizes and shapes of indices. Alternatively, parameters of the position and orientation may be directly estimated as unknown parameters.

<Modification 4>

A position and orientation measurement apparatus which comprises both the functions of the first and second embodiment may be configured. As a simple arrangement, the notification unit 660 notifies necessity of re-calibration, and the index allocation information updating unit 160 then executes re-calibration.

A more flexible measure may be taken by interactive processing. As in the second embodiment, the notification unit 660 notifies the user of necessity of re-calibration. The user then inputs his or her decision about a measure to be taken via a UI (User Interface; not shown). When the user selects "execution of re-calibration", the processing of the index allocation information updating unit 160 in the first embodiment is executed to update allocation information of an index. When the user selects "rejection of index", this index is set to be inhibited from being used (be ignored) in the subsequent processing. When the user wants to restore the physical allocation of an index, he or she may make a choice "do nothing". The aforementioned processing may be designated for each index.

<Modification 5>

As indices, for example, edges may be used in addition to the aforementioned indices. More specifically, sides, corners, and the like of a desk which appear in a captured image may be used as indices. Note that it is easy for those who are skilled in the art to appropriately modify various embodiments above using edges as indices.

Third Embodiment

In the above embodiments (including modifications), respective units which form the position and orientation measurement apparatus 100 shown in FIG. 1 and the position and orientation measurement apparatus 600 shown in FIG. 6 are implemented by hardware components. However, the index allocation information holding unit 140 and 640 may be implemented a memory, the image input unit 150 may be implemented an I/F (interface) unit, and some or all of other units may be implemented by computer programs. In this case, a memory of a general PC (personal computer) is used as the index allocation information holding unit 140 and 640, and stores the computer programs. When a CPU of such PC executes the computer programs, this PC serves as the position and orientation measurement apparatus 100 and 600. That is, the PC is applicable to the position and orientation measurement apparatus 100 and 600.

Figure 4:
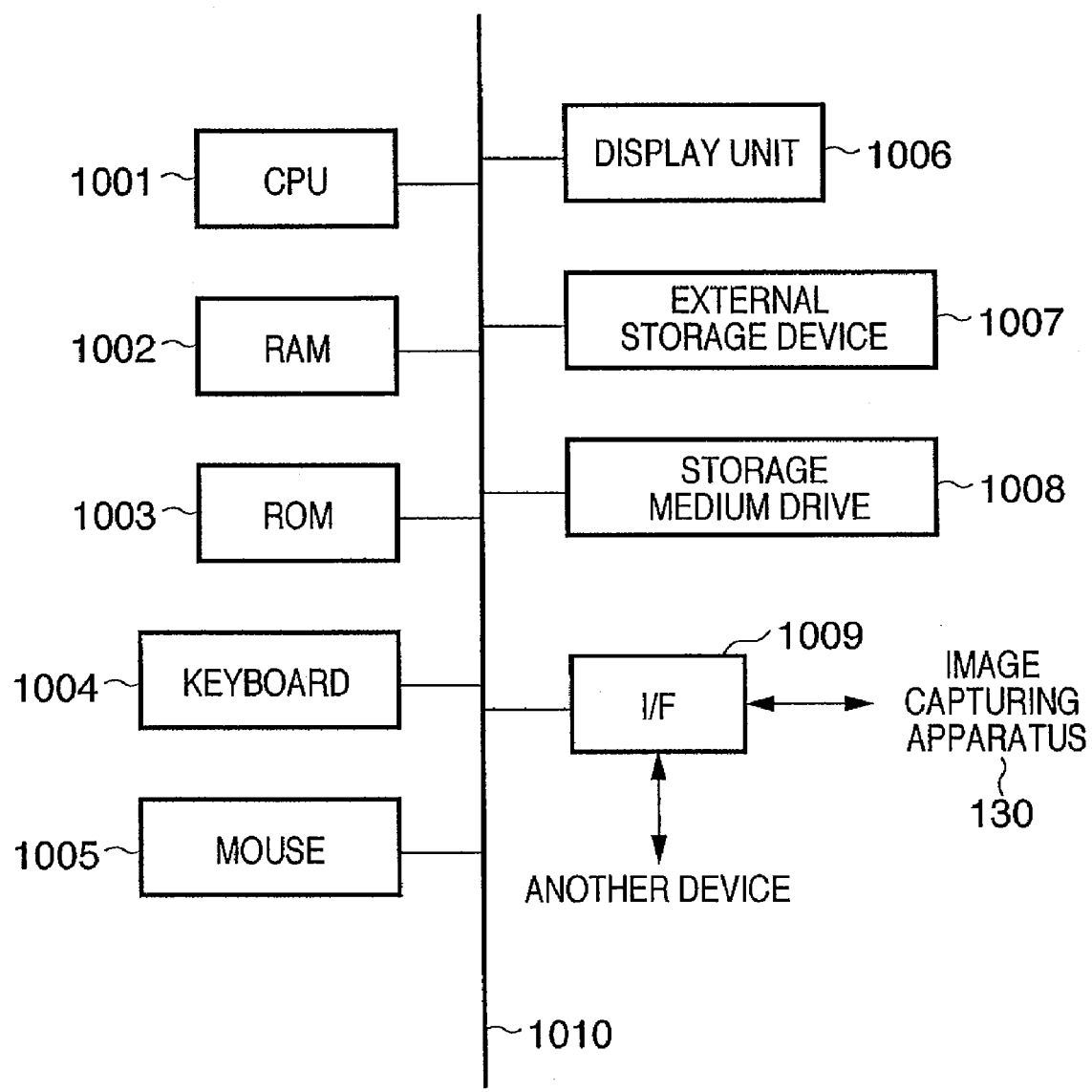
FIG. 4 is a block diagram showing the hardware arrangement of a computer which is applicable to position and orientation measurement apparatuses 100 and 600.

FIG. 4 is a block diagram showing the hardware arrangement of a computer which is applicable to the position and orientation measurement apparatus 100 and 600.

A CPU 1001 controls the overall computer using computer programs and data stored in a RAM 1002 and ROM 1003. These computer programs include those for making the CPU 1001 execute functions of other units except for the index allocation information holding unit 140 and 640 and the image input unit 150 of the units shown in FIGS. 1 and 6. The data include various data (including given information) described in the above embodiments. Therefore, the CPU 1001 executes processing using these computer programs and data, thereby performing operations to be implemented by the position and orientation measurement apparatus 100 or 600.

The RAM 1002 comprises an area for temporarily storing computer programs and data loaded from an external storage device 1007 and storage medium drive 1008. Also, the RAM 1002 comprises a work area used by the CPU 1001 to execute various processes. That is, the RAM 1002 can provide various areas as needed.

The ROM 1003 generally stores a boot program, setting data, and the like of the computer.

A keyboard 1004 and mouse 1005 are examples of input devices which are operated by the operator of the computer. The operator can input various instructions to the CPU 1001 by operating these devices.

A display unit 1006 comprises a CRT, liquid crystal display, or the like, and can display the processing results of the CPU 1001 by means of images, characters, and the like. For example, the display unit 1006 can display various messages to be notified and the like for the operator in the above embodiments. Of course, the display unit 1006 may additionally include a mechanism that can output sounds. In this case, the operator can be audibly notified of the processing results of the CPU 1001.

The external storage device 1007 serves as a large-capacity information storage device represented by a hard disk drive. The external storage device 1007 saves an OS (operating system), and the above computer programs and data. The external storage device 1007 can save data of captured images of respective frames output from the image capturing apparatus 130 via an I/F (interface) 1009. Note that some of data of captured images output from the image capturing apparatus 130 may be stored in the RAM 1002. The computer programs and data saved in the external storage device 1007 are loaded onto the RAM 1002 as needed under the control of the CPU 1001, and are executed by the CPU 1001.

The storage medium drive 1008 reads out computer programs and data stored in a storage medium such as a CD-ROM, DVD-ROM, or the like in accordance with an instruction from the CPU 1001, and outputs them to the RAM 1002 or the external storage device 1007.

The I/F 1009 comprises a plurality of different ports as follows. Some of functions of the image input unit 150 are implemented by an analog video port or digital input and output ports such as IEEE1394 or the like. Data of captured images of respective frames output from the image capturing apparatus 130 are fetched onto the RAM 1002 via the I/F 1009. The data of the position and orientation calculated by the position and orientation calculation unit 120 and index allocation information updating unit 160 are externally output via an Ethernet™ port or the like.

The aforementioned components are interconnected via a bus 1010.

Other Embodiments

The objects of the present invention can be achieved as follows. That is, a recording medium (or storage medium), which records a program code of software that can implement the functions of the above-mentioned embodiments is supplied to a system or apparatus. Of course, such storage medium is a computer-readable storage medium. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing operations based on an instruction of the program code. The present invention also includes a case wherein the functions of the above-mentioned embodiments are implemented by this processing.

Furthermore, assume that the program code read out from the recording medium is written in a memory of a function expansion card or a function expansion unit, which is inserted in or connected to the computer. After that, the functions of the above-mentioned embodiments are implemented by some or all of actual processing operations executed by a CPU or the like arranged in the function expansion card or function expansion unit based on an instruction of the program code. Such case is also included in the present invention.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-115987 filed Apr. 25, 2007 which is hereby incorporated by reference herein in its entirety.

What is claimed is:

1. An information processing apparatus, comprising:
a holding unit adapted to hold, for each of a plurality of indices allocated on a physical space, allocation information and a reliability thereof;
an acquisition unit adapted to acquire a captured image from an image capturing apparatus which captures the physical space;
a detection unit adapted to detect image coordinates of an index from the captured image;
a calculation unit adapted to calculate a position and orientation of the image capturing apparatus using the image coordinates of the index detected by said detection unit and the allocation information held by said holding unit in association with the index;
a re-calibration unit adapted to re-calibrate allocation information of an unreliable index having a reliability indicating that the allocation information is unreliable; and
an updating unit adapted to update the allocation information and the reliability thereof held by said holding unit in association with the unreliable index to the allocation information re-calibrated by said re-calibration unit and a reliability indicating that the allocation information is reliable.

2. The apparatus according to claim 1, wherein said calculation unit calculates the position and orientation of the image capturing apparatus using image coordinates of reliable indices having a reliability indicating that the allocation information is reliable from among the image coordinates of the indices detected by said detection unit, and allocation information held by said holding unit in association with each of the reliable indices.

3. The apparatus according to claim 1, further comprising a unit adapted to calculate a reliability of each index used in calculation processing during the calculation processing by said calculation unit.

4. An information processing apparatus, comprising:
a holding unit adapted to hold, for each of a plurality of indices allocated on a physical space, allocation information and a reliability thereof;
an acquisition unit adapted to acquire a captured image from an image capturing apparatus which captures the physical space;
a detection unit adapted to detect image coordinates of an index from the captured image;
a calculation unit adapted to calculate a position and orientation of the image capturing apparatus using the image coordinates of the index detected by said detection unit and the allocation information held by said holding unit in association with the index; and a notification unit adapted to notify information associated with an unreliable index having a reliability indicating that the allocation information is unreliable.

5. The apparatus according to claim 4, wherein said notification unit displays at least one of identification information of the unreliable index, a message indicating that re-calibration of allocation information is necessary, and a marker used to emphasize the unreliable index, at a position near image coordinates of the unreliable index on the captured image.

6. The apparatus according to claim 4, further comprising:
a unit adapted to calculate image coordinates obtained by projecting allocation information held by said holding unit in association with the unreliable index onto the captured image,
wherein the information associated with the unreliable index is displayed at the projected image coordinates.

7. The apparatus according to claim 6, wherein the information associated with the unreliable index differs according to a reliability for the unreliable index.

8. The apparatus according to claim 4, further comprising:
a unit adapted to select an unreliable index, allocation information of which is to be re-calibrated, from indices notified by said notification unit; and
a unit adapted to re-calibrate allocation information held by said holding unit in association with the selected unreliable index.

9. An information processing apparatus comprising:
a holding unit adapted to hold, for each of a plurality of indices allocated on a physical space, allocation information and a reliability thereof;
an acquisition unit adapted to acquire a captured image from an image capturing apparatus which captures the physical space;
a detection unit adapted to detect image coordinates of an index from the captured image; and
a calculation unit adapted to calculate a position and orientation of the image capturing apparatus using image coordinates of an index having a reliability indicating that the allocation information is reliable from among the image coordinates of indices detected by said detection unit, and the allocation information held by said holding unit in association with that index.

10. An information processing method to be executed by an information processing apparatus which comprises a holding unit which holds, for each of a plurality of indices allocated on a physical space, allocation information and a reliability thereof, said method comprising:
an acquisition step of acquiring a captured image from an image capturing apparatus which captures the physical space;
a detection step of detecting image coordinates of an index from the captured image;
a calculation step of calculating a position and orientation of the image capturing apparatus using the image coordinates of the index detected in the detection step and the allocation information held by the holding unit in association with the index;
a re-calibration step of re-calibrating allocation information of an unreliable index having a reliability indicating that the allocation information is unreliable; and
an updating step of updating the allocation information and the reliability thereof held by the holding unit in association with the unreliable index to the allocation information re-calibrated in the re-calibration step and a reliability indicating that the allocation information is reliable.

11. An information processing method to be executed by an information processing apparatus which comprises a holding unit which holds, for each of a plurality of indices allocated on a physical space, allocation information and a reliability thereof, said method comprising:
an acquisition step of acquiring a captured image from an image capturing apparatus which captures the physical space;
a detection step of detecting image coordinates of an index from the captured image;
a calculation step of calculating a position and orientation of the image capturing apparatus using the image coordinates of the index detected in the detection step and the allocation information held by the holding unit in association with the index; and
a notification step of notifying information associated with an unreliable index having a reliability indicating that the allocation information is unreliable.

12. An information processing method to be executed by an information processing apparatus which comprises a holding unit which holds, for each of a plurality of indices allocated on a physical space, allocation information and a reliability thereof, said method comprising:
an acquisition step of acquiring a captured image from an image capturing apparatus which captures the physical space;
a detection step of detecting image coordinates of an index from the captured image; and
a calculation step of calculating a position and orientation of the image capturing apparatus using image coordinates of an index having a reliability indicating that the allocation information is reliable from among the image coordinates of indices detected in the detection step, and the allocation information held by the holding unit in association with that index.

13. A non-transitory computer-readable storage medium containing computer instructions stored therein for executing an information processing method according to claim 10.

14. A non-transitory computer-readable storage medium containing computer instructions stored therein for executing an information processing method according to claim 11.

15. A non-transitory computer-readable storage medium containing computer instructions stored therein for executing an information processing method according to claim 12.

* * * * *